US010902398B2

(12) United States Patent
Kechik et al.

(10) Patent No.: US 10,902,398 B2
(45) Date of Patent: Jan. 26, 2021

(54) TRANSACTION FEEDBACK DATA COLLECTION

(71) Applicants: Andrey Kechik, Vancouver, WA (US); Vitaliy Kechik, Vancouver, WA (US); Charles Wert, Portland, OR (US); Christopher Wayt, Happy Valley, OR (US)

(72) Inventors: Andrey Kechik, Vancouver, WA (US); Vitaliy Kechik, Vancouver, WA (US); Charles Wert, Portland, OR (US); Christopher Wayt, Happy Valley, OR (US)

( * ) Notice: Subject to any disclaimer, the term of this patent is extended or adjusted under 35 U.S.C. 154(b) by 0 days.

(21) Appl. No.: 13/646,508

(22) Filed: Oct. 5, 2012

(65) Prior Publication Data
US 2014/0101211 A1 Apr. 10, 2014

(51) Int. Cl.
G06Q 20/20 (2012.01)

(52) U.S. Cl.
CPC .................. G06Q 20/20 (2013.01)

(58) Field of Classification Search
CPC ...................................... G06Q 20/20
USPC .......................... 707/825, 804, 944, 999.102
See application file for complete search history.

(56) References Cited

U.S. PATENT DOCUMENTS

| 4,580,492 | A | * | 4/1986 | Troyan | B41F 17/00 |
| | | | | | 101/28 |
| 6,039,244 | A | * | 3/2000 | Finsterwald | G06Q 20/387 |
| | | | | | 235/375 |
| 6,049,778 | A | * | 4/2000 | Walker | G06Q 30/0212 |
| | | | | | 705/14.14 |
| 6,748,365 | B1 | * | 6/2004 | Quinlan | G06Q 20/20 |
| | | | | | 705/14.26 |
| 7,337,948 | B2 | * | 3/2008 | Melick et al. | 235/375 |
| 7,970,669 | B1 | * | 6/2011 | Santos | 705/30 |
| 8,131,577 | B2 | * | 3/2012 | Lessing et al. | 705/7.11 |
| 8,317,086 | B2 | * | 11/2012 | Dudek et al. | 235/375 |
| 8,616,453 | B2 | * | 12/2013 | Itwaru | 235/462.01 |
| 8,639,554 | B2 | * | 1/2014 | Helmus | G06Q 10/103 |
| | | | | | 705/7.26 |
| 8,930,204 | B1 | * | 1/2015 | Igoe | G06Q 30/02 |
| | | | | | 705/2 |
| 9,223,885 | B2 | * | 12/2015 | Marsico | G06F 16/9554 |
| 2001/0042791 | A1 | * | 11/2001 | Postlewaite | G06K 7/10881 |
| | | | | | 235/462.25 |
| 2002/0004749 | A1 | * | 1/2002 | Froseth | G06Q 30/0603 |
| | | | | | 705/16 |
| 2002/0049652 | A1 | * | 4/2002 | Moore | G06Q 10/087 |
| | | | | | 705/29 |
| 2002/0111869 | A1 | * | 8/2002 | Shuster et al. | 705/23 |
| 2002/0161641 | A1 | * | 10/2002 | Quinlan | G06Q 20/20 |
| | | | | | 705/14.25 |
| 2002/0161658 | A1 | * | 10/2002 | Sussman | G06Q 30/0256 |
| | | | | | 705/26.8 |
| 2002/0198788 | A1 | * | 12/2002 | Moskowitz | G06Q 30/0601 |
| | | | | | 705/26.1 |
| 2003/0089782 | A1 | * | 5/2003 | Reed | D06H 1/00 |
| | | | | | 235/468 |

(Continued)

FOREIGN PATENT DOCUMENTS

WO  WO 2009/116954  *  9/2009  ............. G06Q 30/00

Primary Examiner — Phuong Thao Cao

(57) ABSTRACT

Technologies and implementations for collecting feedback related to the occurrence of transactions are generally disclosed.

24 Claims, 6 Drawing Sheets

(56) References Cited

U.S. PATENT DOCUMENTS

| | | | |
|---|---|---|---|
| 2003/0144922 A1* | 7/2003 | Schrantz | G06Q 30/0641 705/26.1 |
| 2004/0054634 A1* | 3/2004 | Tak | G06Q 10/087 705/400 |
| 2004/0078272 A1* | 4/2004 | Brown | G06Q 10/087 705/22 |
| 2006/0116935 A1* | 6/2006 | Evans | G06Q 30/02 705/26.62 |
| 2006/0197838 A1* | 9/2006 | Yamakita | G06K 1/18 348/169 |
| 2006/0247968 A1* | 11/2006 | Kadry | G06Q 50/22 705/14.53 |
| 2006/0286518 A1* | 12/2006 | Yoder | 434/236 |
| 2007/0127693 A1* | 6/2007 | D'Ambrosio et al. | 379/265.06 |
| 2007/0246538 A1* | 10/2007 | Melick et al. | 235/462.01 |
| 2008/0052159 A1* | 2/2008 | Balakrishnan | G06Q 30/016 705/14.36 |
| 2008/0140715 A1* | 6/2008 | Hakos | 707/104.1 |
| 2008/0183588 A1* | 7/2008 | Agrawal | G06Q 30/02 705/16 |
| 2008/0288407 A1* | 11/2008 | Hamel | G06Q 10/10 705/50 |
| 2009/0089111 A1* | 4/2009 | Walker | G06Q 30/0201 705/7.29 |
| 2009/0157749 A1* | 6/2009 | Lessing et al. | 707/104.1 |
| 2009/0188972 A1* | 7/2009 | Koakutsu | G06Q 10/0832 235/375 |
| 2009/0228300 A1* | 9/2009 | Hamel | G06Q 10/08355 705/2 |
| 2009/0240598 A1* | 9/2009 | Kargman | G06Q 30/0633 705/26.1 |
| 2009/0288012 A1* | 11/2009 | Hertel et al. | 715/738 |
| 2010/0262462 A1* | 10/2010 | Tryfon | G06Q 30/0203 705/7.32 |
| 2010/0299197 A1* | 11/2010 | Woodward | G06Q 30/02 705/14.37 |
| 2010/0324971 A1* | 12/2010 | Morsberger | G06Q 30/0245 705/7.32 |
| 2011/0071895 A1* | 3/2011 | Masri | 705/14.27 |
| 2011/0106721 A1* | 5/2011 | Nickerson | G06Q 30/02 705/347 |
| 2011/0145049 A1* | 6/2011 | Hertel et al. | 705/14.23 |
| 2011/0153503 A1* | 6/2011 | Blewett et al. | 705/67 |
| 2011/0281630 A1* | 11/2011 | Omar | 463/17 |
| 2011/0282734 A1* | 11/2011 | Zurada | 705/14.49 |
| 2012/0030032 A1* | 2/2012 | Zurada | 705/14.66 |
| 2012/0109665 A1* | 5/2012 | Knutson | G06Q 10/08 705/1.1 |
| 2012/0116915 A1* | 5/2012 | Zheng | G06Q 30/02 705/26.7 |
| 2012/0127501 A1* | 5/2012 | Kobayashi | 358/1.13 |
| 2012/0173311 A1* | 7/2012 | Chang et al. | 705/14.1 |
| 2012/0191817 A1* | 7/2012 | Sayan | G06Q 30/0601 709/219 |
| 2012/0205433 A1* | 8/2012 | Dudek et al. | 235/375 |
| 2012/0253852 A1* | 10/2012 | Pourfallah et al. | 705/4 |
| 2012/0280030 A1* | 11/2012 | Hashimoto | 235/375 |
| 2012/0321759 A1* | 12/2012 | Marinkovich et al. | 426/231 |
| 2013/0035787 A1* | 2/2013 | Canter | G07F 9/023 700/232 |
| 2013/0035987 A1* | 2/2013 | Dreifus | G06Q 30/02 705/7.32 |
| 2013/0067235 A1* | 3/2013 | Anson | 713/186 |
| 2013/0073365 A1* | 3/2013 | McCarthy | 705/14.23 |
| 2013/0132234 A1* | 5/2013 | Grossi | G06Q 20/3276 705/26.41 |
| 2013/0173404 A1* | 7/2013 | Scipioni | G06Q 30/0282 705/16 |
| 2013/0191180 A1* | 7/2013 | Teo | G06Q 30/0203 705/7.32 |
| 2013/0191197 A1* | 7/2013 | Hamrick | G06Q 30/0217 705/14.19 |
| 2013/0206834 A1* | 8/2013 | Itwaru | 235/379 |
| 2013/0212004 A1* | 8/2013 | Itwaru | G06Q 20/20 705/39 |
| 2013/0282458 A1* | 10/2013 | Roberts | G06Q 30/0201 705/14.19 |
| 2013/0304538 A1* | 11/2013 | Arad | G06Q 30/0201 705/7.29 |
| 2013/0311875 A1* | 11/2013 | Pappas et al. | 715/234 |
| 2013/0311901 A1* | 11/2013 | Francois | 715/753 |
| 2014/0026048 A1* | 1/2014 | Spirer | 715/716 |

* cited by examiner

500 Feedback Form

510a Feedback Description

512a Check Box

514a Check Box

510b Feedback Description

512b Check Box

514b Check Box

510c Feedback Description

512c Check Box

514c Check Box

Fig. 5

TRANSACTION FEEDBACK DATA COLLECTION

BACKGROUND

Businesses and service providers may desire to collect feedback related to their services and products. For example, feedback from customers related to their impressions of the products and/or services may be desired. In particular it may be desirable to collect feedback from a large sample of customers. Additionally, feedback related to specific occurrences of a particular type of transaction may be desired. For example, a business (e.g., a coffee shop, a car dealership, or the like) may desire to collect feedback from all customers who received a particular type of service (e.g., ordered coffee, had an automotive service, or the like) on a particular day.

SUMMARY

In general, the present disclosure is drawn, inter alia, to methods and apparatuses for receiving feedback from customers. In some embodiments of the present disclosure, feedback may be received by generating an automatically capturable indicator, which the customer may use to initiate the feedback process. In response to the automatically capturable indicator being captured, a feedback form may be generated and one or more inputs from the feedback form received.

Example methods may include generating an automatically capturable indicator based at least in part on an occurrence of a transaction, receiving an indication that the automatically capturable indicator has been captured, providing one or more details related to the occurrence of the transaction, wherein providing one or more details related to the occurrence of the transaction facilitates generating a feedback form related to the occurrence of the transaction, receiving one or more inputs based at least in part on a generated feedback form, and uploading the received one or more inputs to a transaction occurrence database.

The present disclosure describes various example computer readable medium. Example computer readable medium may have instructions stored therein which, when executed by one or more processors, cause a computer to generate an automatically capturable indicator based at least in part on an occurrence of a transaction, receive an indication that the automatically capturable indicator has been captured, provide one or more details related to the occurrence of the transaction, wherein the provided one or more details related to the occurrence of the transaction facilitate generating a feedback form related to the occurrence of the transaction, receive one or more inputs based at least in part on a generated feedback form, and upload the received one or more inputs to a transaction occurrence database.

Additionally, the present disclosure also describes various example devices. Example devices may include a processor and one or more machine readable medium having instructions stored therein, which when executed by the processor cause the apparatus to generate an automatically capturable indicator based at least in part on an occurrence of a transaction, receive an indication that the automatically capturable indicator has been captured, provide one or more details related to the occurrence of the transaction, wherein providing one or more details related to the occurrence of the transaction facilitates generating a feedback form related to the occurrence of the transaction, receive one or more inputs based at least in part on a generated feedback form, and upload the received one or more inputs to a transaction occurrence database.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various examples, embodiments, and implementations of the present disclosure will be described by way of reference to the accompanying drawings, understanding that these drawings depict only several embodiments in accordance with the disclosure, and are therefore, not to be considered limiting of its scope.

In the drawings:

FIG. 5 illustrates a block diagram of an example feedback form;

DETAILED DESCRIPTION

Figure 1:
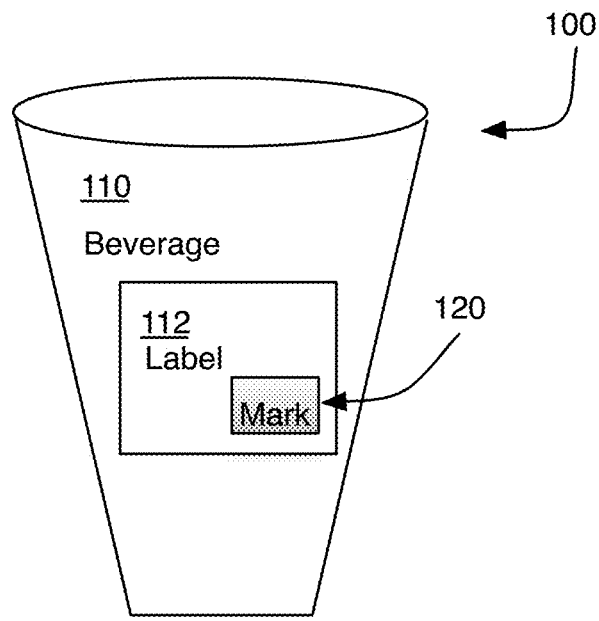
FIG. 1 illustrates a block diagram of an example product.

The following description sets forth various examples along with specific details to provide a thorough understanding of the claimed subject matter. It will be understood by those skilled in the art that the claimed subject matter might be practiced without some or more of the specific details disclosed herein. Further, in some circumstances, well-known methods, procedures, systems, components and/or circuits have not been described in detail, in order to avoid unnecessarily obscuring the claimed subject matter.

In the following detailed description, reference is made to the accompanying drawings, which form a part hereof. In the drawings, similar symbols typically identify similar components, unless context dictates otherwise. Furthermore, various items depicted in the drawings may not necessarily be to scale, unless specified herein. The figures are presented for example and illustration to complement the present disclosure and should not be taken as limiting.

The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As indicated above, various embodiments of the present disclosure may be implemented to facilitate the collection of feedback related to the occurrence(s) of a transaction. In general, providing an automatically capturable indicator may facilitate feedback collection. A feedback form may be generated based in part on the automatically capturable indicator. The feedback form may then be used to receive feedback (e.g., from a customer, or the like). For example, a coffee shop may provide a Q-code on the label of specific beverages. Customers may then scan the Q-code (e.g., using a smart phone, using a tablet computer, using a device provided by the coffee shop, or the like). Upon scanning the Q-code, a feedback form may be generated. The device may then display the feedback form. Accordingly, feedback related to the beverage and transaction may be collected from customers. Particularly, feedback related to the beverage and/or transaction may be collected from the customers shortly after the occurrence of the transaction. For example, a customer may use their smart phone to scan the Q-code and provide feedback while consuming the beverage in the coffee shop.

It is to be appreciated, that this example is given for illustrative purposes only and is not intended to be limiting. For example, feedback related to other services (e.g., automotive services, restaurant services, airline services, health services, or the like) may be collected.

FIG. 1 illustrates a block diagram of an example product 100 that may correspond to a particular transaction in which feedback is desired. As can be seen from this figure, the product 100 may include a beverage 110 having a label 112. The label 112 may include an automatically capturable indicator 120. In general, the automatically capturable indicator 120 may be a mark (e.g., image, pattern, symbol, token, or the like) that may be captured (e.g., scanned, recognized, imaged, optically recognized, or the like) in an automated fashion.

For example, the automatically capturable indicator 120 may be a Q-code, a uniform product code (UPC) symbol, or a barcode. Additionally, it will be appreciated that other various graphics, codes, symbols, or combinations thereof may be used to implement the automatically capturable indicator 120. As used herein, automatically may not necessarily mean without external input. For example, in some embodiments disclosed herein, the automatically capturable indicator 120 may be captured using the camera on a smart phone. Accordingly, the process of capturing the automatically capturable indicator 120 may include activating the camera on the smart phone.

It is to be appreciated, that various embodiments provided herein are not limited to the example product features in FIG. 1. For example, an airline service provider may provide a capturable indicator (e.g., on a ticket, on a boarding pass, or the like) for use in receiving feedback as described herein.

Figure 2:
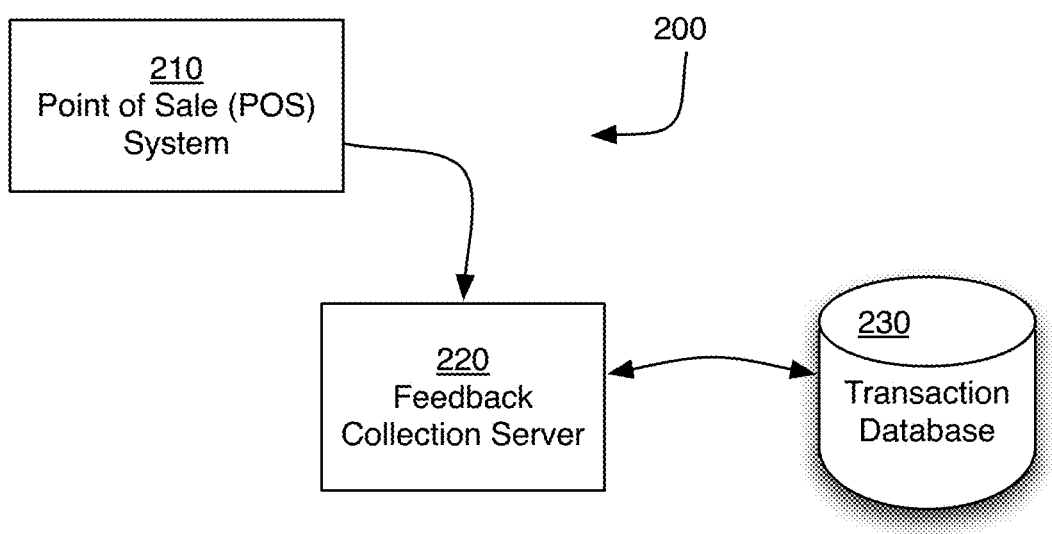
FIG. 2 illustrates a block diagram of an example feedback collection system.

FIG. 2 illustrates a block diagram of an example feedback collection system 200, arranged in accordance with at least some embodiments of the present disclosure. As can be seen from this figure, the feedback collection system 200 may include a point of sale (POS) system 210, a feedback collection server 220, and a transaction database 230. In general, the feedback collection system 200 may be configured to collect feedback related to the occurrence of a transaction. For example, the POS system 210 may generate an automatically capturable indicator (e.g., the automatically capturable indicator 120, or the like) at the occurrence of the transaction. The POS system 210 may also transmit details associated with the transaction to the feedback collection server 220. The feedback collection server 220 may then add the details along with received feedback responses to the transaction database 230.

Using the example coffee shop detailed above, the POS system 210 may generate and print the automatically capturable indicator 120 at the time the beverage 110 is ordered. Additionally, details associated with the transaction (e.g., time of occurrence, beverage ordered, cashier, barista, equipment used to create the beverage, or the like) may be transmitted to the feedback collection server 220. Once the automatically capturable indicator 120 is captured (e.g., scanned, or the like) the feedback collection server 220 may be configured to provide one or more of the details (e.g., barista, type of beverage, or the like) in order to facilitate the generation of a feedback form. The feedback collection server 220 may additionally be configured to receive one or more responses based in part on the generated feedback form and transmit the responses to the transaction database 230.

Figure 3:
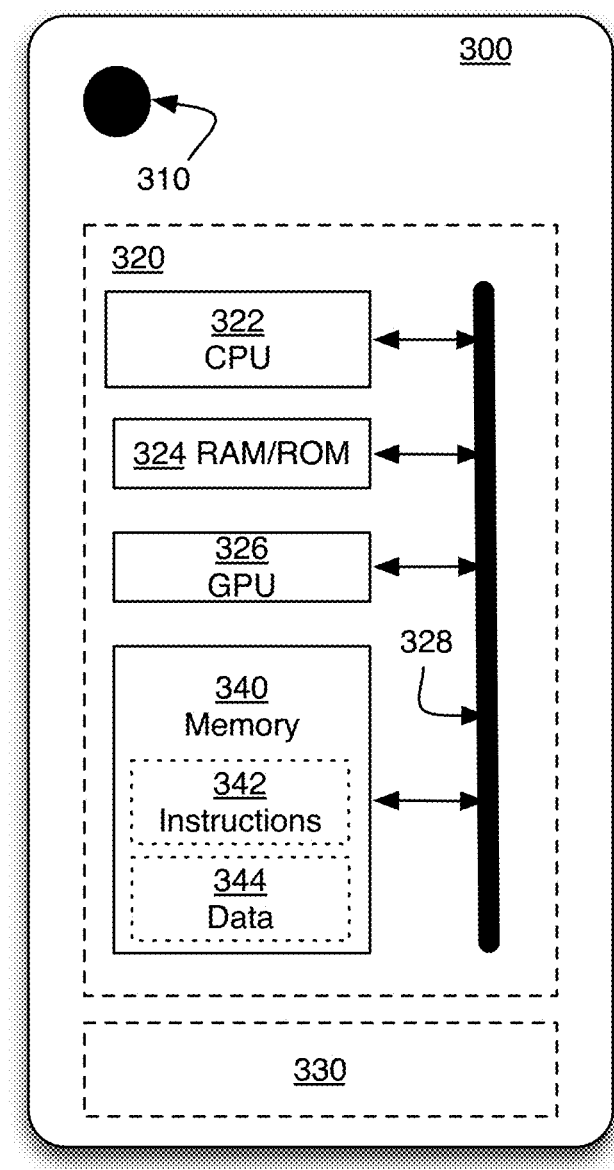
FIG. 3 illustrates a block diagram of an example computing device.

FIG. 3 illustrates an example computing device 300, arranged in accordance with at least some embodiments of the present disclosure. In some embodiments, the computing device 300 may be a portable computing device (e.g., a smart phone, a tablet computer, or the like). As can be seen from this figure, the computing device 300 may include a camera 310, computing logic 320 and a power source 330. In general, the computing device 300 may include logic and/or features configured to capture the automatically capturable indicator 120, generate a feedback form based in part upon the automatically capturable indicator 120, and receive one or more feedback responses based in part upon the feedback form.

In some embodiments of the present disclosure, the computing logic 320 may include a central processing unit (CPU) 322, operating memory (RAM/ROM) 324, and a graphics processing unit (GPU) 326, all connected via a bus 328. In addition, although not shown, the camera 310 and/or the power source 330 may be connected to the computing logic 320 via the bus 328. The computing logic 320 may also include memory 340. Memory 340 may be any type of computer-readable medium (e.g., flash memory, spinning media, or the like). In general, the memory 340 may be configured to store instructions 342 and data 344 that allow the computing device 300 to implement various embodiments of the present disclosure. For example, the memory 340 may store instructions 342 that when executed by the CPU 322 cause the computing device 300 to collect feedback related to a transaction. In some embodiments disclosed herein, the memory 340 may store instructions 342 that when executed by the CPU 322 cause the computing device 300 to perform one or more of the methods detailed herein.

As stated, with some embodiments of the present disclosure, the computing device 300 may be implemented as a smart phone device. In alternative embodiments of the present disclosure, the vendor of the product or service in which feedback is desired may provide the computing device 300. Reusing the coffee shop example again, the coffee shop may provide a computing device (e.g., a tablet computer, a computer terminal with a scanner, or the like) at the coffee shop for customers to provide feedback as described herein. As an alternate example, an airline company may provider the computing device 300 at an airport (e.g., in the terminal, or the like).

Figure 4:
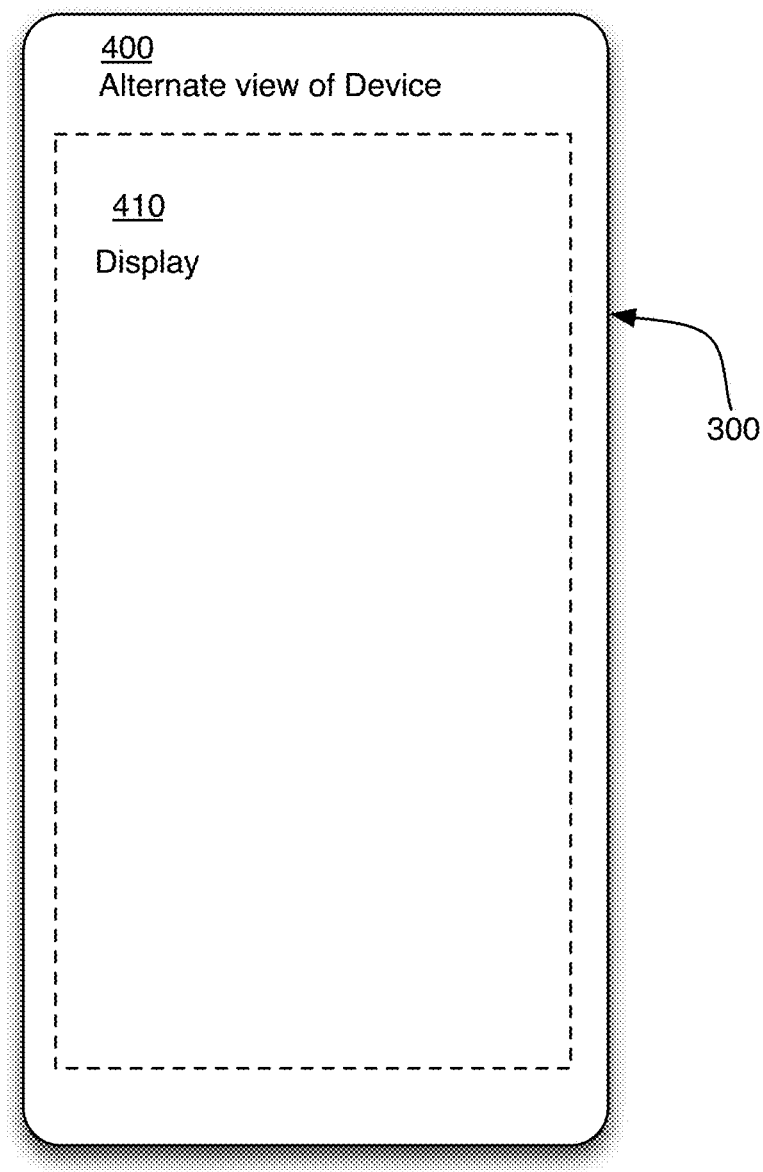
FIG. 4 illustrates a block diagram of an alternate view of the example computing device illustrated in FIG. 23.

FIG. 4 illustrates a block diagram of an alternate view 400 of the example computing device 300. As can be seen from this figure, the computing device 300 (as indicated by view 400) may include a display 410. In some embodiments of the present disclosure, the display 410 may facilitating displaying a feedback form and receiving one or more responses based on the feedback form. For example, the display 410 may be a touch-enabled display. Accordingly, the device 300 may display a feedback form (e.g., having check boxes, selection sliders, or the like) on the display 410. The device 300 may then receive, via the touch-enabled display 410, one or more responses (e.g., corresponding to a selected check box, or the like).

FIG. 5 illustrates an example feedback form 500, which may be generated according to various embodiments of the present disclosure. As can be seen from this figure, the feedback form 500 may include feedback descriptions 510 and check boxes 512 and 514. In general, the feedback descriptions 510 may be a textual or visual depiction of the feedback requested. For example, the feedback description 510a may ask whether the expected transaction was received. As a further example, if the transaction corresponded to a beverage, such as, for example, as might be received at a coffee shop, the feedback description 510a may ask whether the ordered beverage was received. Accordingly, the check boxes 512a and 514a may correspond to yes and no responses.

As an alternate example, the feedback description 510 may ask whether the service associated with the transaction was satisfactory. Accordingly, the check boxes 512 and 514 may correspond to varying levels of service (e.g., good, acceptable, poor, or the like). It is to be appreciated that other methods of receiving feedback (e.g., sliders, voice input, or the like) may be implemented in place of the check boxes 512 and 514 shown in FIG. 5. Additionally, it is to be appreciated, that the example feedback items detailed above are not intended to be limiting. Other feedback questions may be asked or associated with the feedback descriptors 510. Additionally, although only two responses (e.g., the check boxes 512 and 514 are shown), more or less than two responses may be associated with a feedback question.

Figure 6:
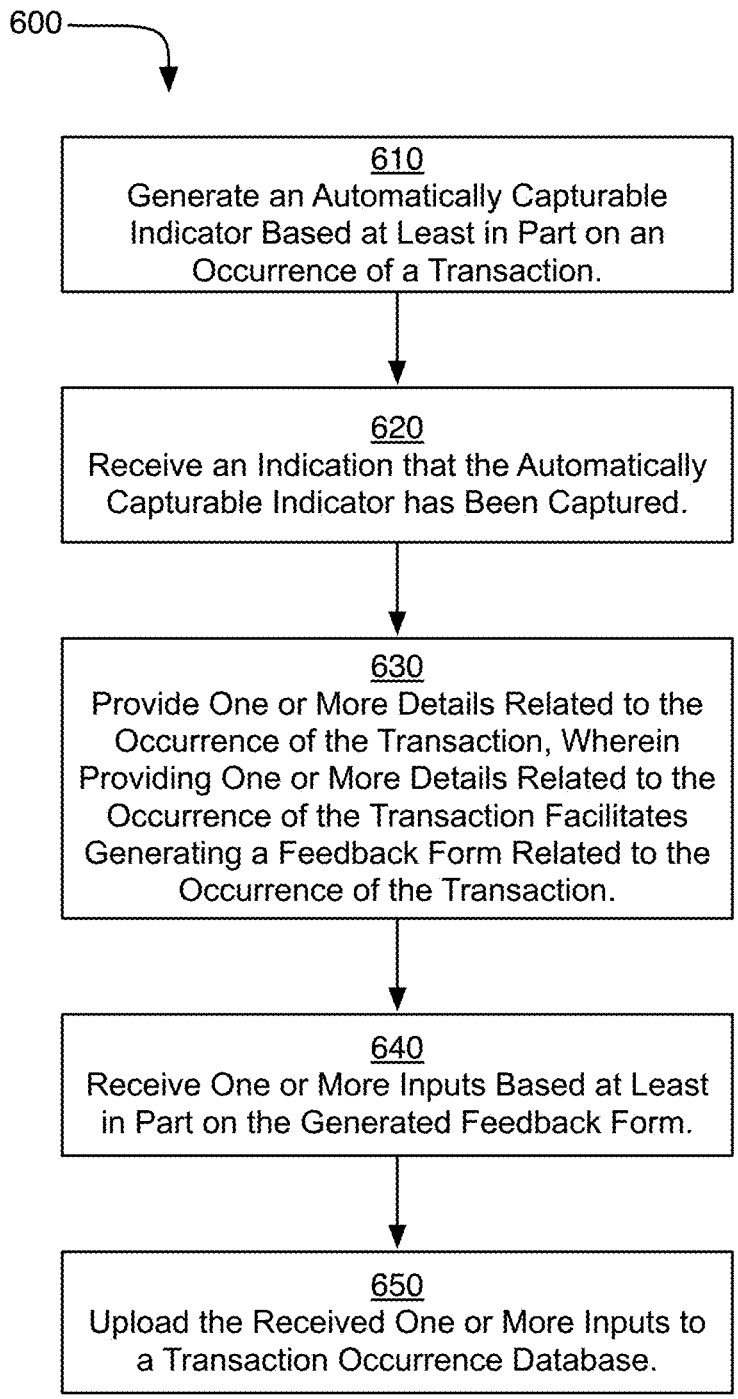
FIG. 6 illustrates a block diagram of an example method of receiving feedback related to a transaction.
Figure 7:
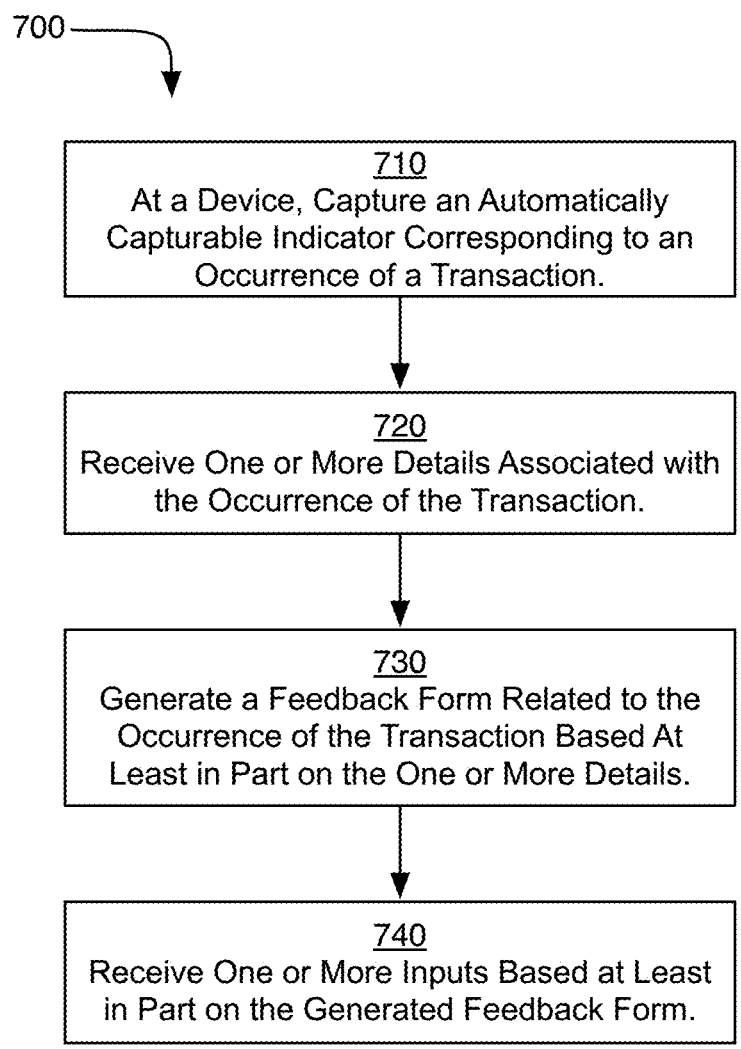
FIG. 7 illustrates a block diagram of another example method of receiving feedback related to a transaction, all arranged in accordance with at least some embodiments of the present disclosure.

FIG. 6 illustrates a block diagram of a method 600, arranged in accordance with various embodiments of the present disclosure. Additionally, FIG. 7 illustrates a diagram of a method 700, arranged in accordance with various embodiments of the present disclosure. In some portions of the description, illustrative implementations of the methods 600 and 700 may be described with reference to the elements of the product 100 of FIG. 1, the feedback collection system 200 of FIG. 2, the device 300 of FIGS. 3 and 4, and/or the feedback form 500 of FIG. 5. However, the described embodiments are not limited in these respects. That is some elements shown in FIGS. 1-5 may be omitted from example implementations of the methods detailed herein. Furthermore, other elements not depicted in FIGS. 1-5 may be used to implement example methods.

Additionally, FIGS. 6 and 7 employ block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of claimed subject matter.

Turning to FIG. 6, the method 600 may begin at block 610 ("Generate an Automatically Capturable Indicator Based at Least in Part on an Occurrence of a Transaction"). In general, at block 610, the POS system 210 may include logic and/or features configured to generate the automatically capturable indicator 120. In some embodiments, the automatically capturable indicator may be printed and affixed to the product 100, a receipt corresponding to the transaction, and/or the like.

Processing may continue from block 610 to block 620 ("Receive an Indication that the Automatically Capturable Indicator has Been Captured"). In general, at block 620, the feedback collection server 220 may include logic and/or featured configured to receive an indication that the automatically capturable indicator 120 has been captured. For example, the camera 310 may be used to capture the automatically capturable indicator 120. Accordingly, the device 300 may be configured to notify the feedback collection server 220 that the automatically capturable indicator 120 has been recognized. As such, the feedback collection server 220 may receive an indication that the automatically capturable indicator 120 has been captured.

Processing may continue from block 620 to block 630 ("Provide One or More Details Related to the Occurrence of the Transaction, Wherein Providing One or More Details Related to the Occurrence of the Transaction Facilitates Generating a Feedback Form Related to the Occurrence of the Transaction"). In general, at block 630, the feedback collection server may include logic and/or features configured to provide one or more details associated with the occurrence of the transaction to the device 300. Using the coffee shop example detailed above, the feedback collection server 220 may provide details (e.g., the type of beverage ordered, the barista, or the like) to the device 300. These one or more details may then be used by the device to generate a feedback form (e.g., the feedback from 500, or the like), which may be displayed on the display 410.

Processing may continue from block 630 to block 640 ("Receive One or More Inputs Based at Least in Part on the Generated Feedback Form"). In general, at block 640, the feedback collection server 220 may include logic and/or features configured to receive one or more feedback responses associated with the transaction. For example, if the feedback form asked if the correct beverage was made, a response (e.g., yes, no, or the like) may be received.

Processing may continue from block 640 to block 650 ("Upload the Received One or More Inputs to a Transaction Occurrence Database"). In general, at block 650, the feedback collection server 220 may include logic and/or features configured to upload the received inputs to the transaction database 230. For example, the feedback collection server may upload (e.g., insert, add, merge, or the like) the responses to entries in the transaction database 230.

Turning to FIG. 7, the method 700 may begin at block 710 ("At a Device, Capture an Automatically Capturable Indicator Corresponding to an Occurrence of a Transaction"). In general, at block 710, the device 300 may include logic and/or features configured to capture the automatically capturable indicator 120. For example, the device 300 may include logic and/or features configured to recognize the automatically capturable indicator 120 using the camera 310.

Processing may continue from block 710 to block 720 ("Receive One or More Details Associated with the Occurrence of the Transaction"). In general, at block 720, the device 300 may include logic and/or features configured to receive one or more details associated with the occurrence of a transaction from the feedback server 220. For example, upon capturing the automatically capturable indicator, the device 300 may contact the feedback server 220 and request one or more details associated with the transaction by providing an identity of the transaction (e.g., time, place, transaction reference number, or the like) determined from the automatically capturable indicator. The device 300 may then receive one or more details associated with the transaction from the feedback server 220.

Processing may continue from block 720 to block 730 ("Generate a Feedback Form Related to the Occurrence of the Transaction Based At Least in Part on the One or More Details"). In general, at block 730, the device 300 may include logic and/or features configured to generate a feedback form (e.g., the feedback form 500, or the like). For example, the device 300 may generate a feedback form to display on the display 410.

Processing may continue from block 730 to block 740 ("Receive One or More Inputs Based at Least in Part on the Generated Feedback Form"). In general, at block 740, the device 300 may include logic and/or features configured to receive one or more inputs based upon the generated feedback form. For example, the device 300 may be configured to receive inputs via the display 410 as detailed above.

What is claimed is:

1. A computer-implemented method comprising:
   generating an automatically capturable indicator based at least in part on an occurrence of a transaction corresponding to a product, the occurrence of the transaction corresponding to an order completion, the automatically capturable indicator configured to be affixed to the product, and the automatically capturable indicator having information related to individual components of the product, the individual components including at least one of a time of making the product at the occurrence of the transaction, a handler of the product at the occurrence of the transaction, or an equipment used to make the product at the occurrence of the transaction;
   receiving an indication that the automatically capturable indicator has been captured;
   providing one or more details related to the occurrence of the transaction, wherein providing one or more details related to the occurrence of the transaction facilitates generating a feedback form related to the occurrence of the transaction and including information related to the order completion at the time of the occurrence of the transaction;
   receiving one or more inputs based at least in part on the generated feedback form; and
   uploading the received one or more inputs to a transaction occurrence database.

2. The computer-implemented method of claim 1, further comprising:
   detecting the occurrence of the transaction;
   determining the one or more details related to the occurrence of the transaction; and
   adding the one or more details to the transaction occurrence database.

3. The computer-implemented method of claim 1, wherein the automatically capturable indicator is a Q-code, a uniform product code (UPC) symbol, or a barcode.

4. The computer-implemented method of claim 1, wherein generating an automatically capturable indicator based at least in part on an occurrence of a transaction comprises printing the automatically capturable indicator.

5. The computer-implemented method of claim 1, wherein the automatically capturable indicator is captured by a device and wherein receiving an indication that the automatically capturable indicator has been captured comprises receiving a request from the device to access the one or more details related to the occurrence of the transaction.

6. The computer-implemented method of claim 5, wherein the one or more details related to the occurrence of the transaction are provided to the device.

7. A computer-implemented method comprising:
   at a device, capturing an automatically capturable indicator corresponding to an occurrence of a transaction corresponding to a product, the occurrence of the transaction corresponding to an order completion, the automatically capturable indicator configured to be affixed to the product, and the automatically capturable indicator having information related to individual components of the product, the individual components including at least one of a time of making the product at the occurrence of the transaction, a handler of the product at the occurrence of the transaction, or an equipment used to make the product at the occurrence of the transaction;
   receiving one or more details associated with the occurrence of the transaction;
   generating a feedback form related to the occurrence of the transaction, the feedback form including information based at least in part on the one or more details related to the order completion; and
   receiving one or more inputs based at least in part on the generated feedback form.

8. The computer-implemented method of claim 7, wherein the automatically capturable indicator is a Q-code, a uniform product code (UPC) symbol, or a barcode.

9. The computer-implemented method of claim 7, wherein the device includes a camera and wherein capturing the automatically capturable indicator includes capturing an image of the automatically capturable indicator using the camera.

10. The computer-implemented method of claim 7, wherein the device includes a display and wherein generating a feedback form related to the occurrence of the transaction based at least in part on the one or more details comprises displaying the feedback form on the display.

11. The computer-implemented method of claim 7, further comprising providing the one or more inputs to a server.

12. A machine-readable non-transitory medium having instructions stored therein which, when executed by one or more processors, cause a computer to:
   generate an automatically capturable indicator based at least in part on an occurrence of a transaction corresponding to a product, the occurrence of the transaction corresponding to an order completion and the automatically capturable indicator configured to be affixed to the product, and the automatically capturable indicator having information related to individual components of the product, the individual components including at least one of a time of making the product at the occurrence of the transaction, a handler of the product at the occurrence of the transaction, or an equipment used to make the product at the occurrence of the transaction;
   receive an indication that the automatically capturable indicator has been captured;

provide one or more details related to the occurrence of the transaction, wherein the provided one or more details related to the occurrence of the transaction facilitate generating a feedback form related to the occurrence of the transaction and including information related to the order completion at the occurrence of the transaction;

receive one or more inputs based at least in part on the generated feedback form; and upload the received one or more inputs to a transaction occurrence database.

13. The machine-readable non-transitory medium of claim 12 having further instructions stored therein which, when executed by one or more processors, cause a computer to:

detect the occurrence of the transaction;

determine the one or more details related to the occurrence of the transaction; and add the one or more details to the transaction occurrence database.

14. The machine-readable non-transitory medium of claim 12, wherein the automatically capturable indicator is a Q-code, a uniform product code (UPC) symbol, or a barcode.

15. The machine-readable non-transitory medium of claim 12, wherein generating an automatically capturable indicator based at least in part on an occurrence of a transaction comprises printing the automatically capturable indicator.

16. The machine-readable non-transitory medium of claim 12, wherein the automatically capturable indicator is captured by a device and wherein receiving an indication that the automatically capturable indicator has been captured comprises receiving a request from the device to access the one or more details related to the occurrence of the transaction.

17. The machine-readable non-transitory medium of claim 16, wherein the one or more details related to the occurrence of the transaction are provided to the device.

18. A machine-readable non-transitory medium having instructions stored therein which, when executed by one or more processors, cause a device to:

capture an automatically capturable indicator corresponding to an occurrence of a transaction corresponding to a product, the occurrence of the transaction corresponding to an order completion and the automatically capturable indicator configured to be affixed to the product, and the automatically capturable indicator having information related to individual components of the product, the individual components including at least one of a time of making the product at the occurrence of the transaction, a handler of the product at the occurrence of the transaction, or an equipment used to make the product at the occurrence of the transaction;

receive one or more details associated with the occurrence of the transaction;

generate a feedback form related to the occurrence of the transaction, the feedback form including information based at least in part on the one or more details related to the order completion; and receive one or more inputs based at least in part on the generated feedback form.

19. The machine-readable non-transitory medium of claim 18, wherein the automatically capturable indicator is a Q-code, a uniform product code (UPC) symbol, or a barcode.

20. The machine-readable non-transitory medium of claim 18, wherein the device includes a camera and wherein capturing the automatically capturable indicator includes capturing an image of the automatically capturable indicator using the camera.

21. The machine-readable non-transitory medium of claim 18, wherein the device includes a display and wherein generating a feedback form related to the occurrence of the transaction based at least in part on the one or more details comprises displaying the feedback form on the display.

22. An apparatus comprising:

a hardware processor; and one or more machine readable medium having instructions stored therein, which when executed by the hardware processor cause the apparatus to:

generate an automatically capturable indicator based at least in part on an occurrence of a transaction corresponding to a product, the occurrence of the transaction corresponding to an order completion and the automatically capturable indicator configured to be affixed to the product, and the automatically capturable indicator having information related to individual components of the product, the individual components including at least one of a time of making the product at the occurrence of the transaction, a handler of the product at the occurrence of the transaction, or an equipment used to make the product at the occurrence of the transaction;

receive an indication that the automatically capturable indicator has been captured;

provide one or more details related to the occurrence of the transaction, wherein providing one or more details related to the occurrence of the transaction facilitates generating a feedback form related to the occurrence of the transaction and including information related to the order completion at the occurrence of the transaction;

receive one or more inputs based at least in part on the generated feedback form; and upload the received one or more inputs to a transaction occurrence database.

23. The apparatus of claim 22, wherein the automatically capturable indicator is a Q-code, a uniform product code (UPC) symbol, or a barcode.

24. The apparatus of claim 22, further comprising a printer and wherein generating an automatically capturable indicator based at least in part on an occurrence of a transaction comprises printing the automatically capturable indicator on the printer.

* * * * *